(12) United States Patent
Hansen et al.

(10) Patent No.: US 7,570,619 B2
(45) Date of Patent: Aug. 4, 2009

(54) LONG TRAINING SEQUENCE METHOD AND DEVICE FOR WIRELESS COMMUNICATIONS

(75) Inventors: Christopher J. Hansen, Sunnyvale, CA (US); Jason Alexander Trachewsky, Menlo Park, CA (US); Rajendra T. Moorti, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 497 days.

(21) Appl. No.: 11/056,156

(22) Filed: Feb. 14, 2005

(65) Prior Publication Data

US 2005/0180361 A1 Aug. 18, 2005

Related U.S. Application Data

(60) Provisional application No. 60/568,914, filed on May 7, 2004, provisional application No. 60/545,854, filed on Feb. 19, 2004, provisional application No. 60/544,605, filed on Feb. 13, 2004.

(51) Int. Cl.
*H04Q 7/00* (2006.01)
(52) U.S. Cl. .................. 370/334; 370/319; 370/336; 370/370; 455/450; 455/552.1
(58) Field of Classification Search ................ 370/328, 370/329–332, 334–337, 341–343, 345, 347, 370/319–321, 370; 455/269, 277.1, 2, 272, 455/278.1, 422, 1, 435.1, 450, 550.1, 552.1
See application file for complete search history.

(56) References Cited

U.S. PATENT DOCUMENTS

| 6,307,882 | B1 * | 10/2001 | Marzetta ..................... 375/224 |
| 6,332,072 | B1 * | 12/2001 | Johnson et al. ........... 455/277.1 |
| 6,711,124 | B2 * | 3/2004 | Khayrallah et al. ......... 370/208 |
| 6,724,842 | B1 * | 4/2004 | Hochwald et al. .......... 375/347 |
| 6,922,549 | B2 * | 7/2005 | Lyons et al. ............. 455/67.13 |
| 2003/0108117 | A1 * | 6/2003 | Ketchum et al. ............ 375/295 |
| 2004/0081074 | A1 * | 4/2004 | Piechocki ................... 370/206 |
| 2004/0146025 | A1 * | 7/2004 | Hwang et al. ............... 370/334 |
| 2004/0209579 | A1 * | 10/2004 | Vaidyanathan .............. 455/101 |
| 2005/0035885 | A1 * | 2/2005 | Hosur et al. .................. 341/50 |

* cited by examiner

*Primary Examiner*—Nhan T Le
(74) *Attorney, Agent, or Firm*—McAndrews, Held & Malloy, Ltd.

(57) ABSTRACT

A method and device for transmitting a frame of a wireless communication begins by generating a preamble of the frame that includes a short training sequence and at least one long training sequence. The at least one long training sequence includes non-zero energy on each of a plurality of subcarriers except a DC subcarrier. The at least one long training sequence corresponds to the number of antennas and applicable wireless communication standards. A matrix is defined to represent the at least one long training sequence. The preamble is compatible with legacy and current standards. A channel is defined with a set of sub carriers to transmit the frame.

21 Claims, 7 Drawing Sheets

LONG TRAINING SEQUENCE METHOD AND DEVICE FOR WIRELESS COMMUNICATIONS

CROSS-REFERENCE TO RELATED APPLICATIONS

This patent application is claiming priority under 35 USC § 119 to the following patent applications: U.S. Provisional Patent Application Ser. No. 60/544,605, filed on Feb. 13, 2004; Ser. No. 60/545,854, filed on Feb. 19, 2004; and U.S. Provisional Patent Application Ser. No. 60/568,914, filed on May 7, 2004.

BACKGROUND OF THE INVENTION

1. Field of the Invention

This invention relates generally to wireless communication systems and more particularly to supporting multiple wireless communication protocols within a wireless local area network using a long training sequence.

2. Description of Related Art

Wireless and wire lined communications are supported by current and legacy devices within existing networks and systems. Communication systems may include from national or international cellular telephone systems to, the Internet, and point-to-point in-home wireless networks. A communication system is constructed, and may operate, in accordance with one or more communication standards or protocols. Wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and the like.

The IEEE 802.11 specification has evolved from IEEE 802.11 to IEEE 802.11b to IEEE 802.11a and to IEEE 802.11g. Wireless communication devices that are compliant with IEEE 802.11b (standard 11b) may exist in the same wireless local area network (WLAN) as IEEE 802.11g (standard 11g) compliant wireless communication devices. Further, IEEE 802.11a (standard 11a) compliant wireless communication devices may reside in the same WLAN as standard 11g compliant wireless communication devices.

The different standards may operate within different frequency ranges, such as 5 to 6 gigahertz (GHz) or 2.4 GHz. For example, standard 11a may operate within the higher frequency range. One aspect of standard 11a is that portions of the spectrum between 5 to 6 GHz are allocated to a channel. The channel may be 20 megahertz (MHz) wide within the frequency band. Standard 11a also may use orthogonal frequency division multiplexing (OFDM). OFDM may be implemented over sub-carriers that represent lines, or values, within the frequency domain of the 20 MHz channels. The signal may be transmitted over many different sub-carriers within the channel. The sub-carriers are orthogonal to each other so that information may be extracted off each sub-carrier about the signal.

A communication system also may include legacy wireless devices. Legacy devices are those devices compliant with an earlier version of the standard, but reside in the same WLAN as devices compliant with a later version of the standard. A mechanism may be employed to ensure that legacy devices know when the newer version devices are utilized in the wireless channel to avoid a collision.

Thus, newer devices or components using current standards should have backward compatibility with already installed equipment within a network. These devices and components should be adaptable to legacy standards and current standards when transmitting information within the network. Legacy devices or components may be kept off the air or out of the network so as not to interfere or collide with information that they are not familiar with. For example, if the legacy device receives a signal or information supported by a newer standard, then the device should forward the information or signal to the appropriate destination without modifying or terminating the signal or information. Further, the received signal information may not react to the legacy device as if the legacy device is a device compatible with the newer standard.

For example, backward compatibility with legacy devices may be enabled exclusively at either the physical (PHY) layer or the Media-Specific Access Control (MAC) layer. At the PHY layer, backward compatibility is achieved by re-using the PHY preamble from a previous standard. Legacy devices may decode the preamble portion of all signals, which provides sufficient information for determining that the wireless channel is in use for a specific period of time, and avoid interference even though the legacy devices cannot fully demodulate or decode the transmitted frame(s).

At the MAC layer, backward compatibility with legacy devices may be enabled by forcing devices that are compliant with a newer version of the standard to transmit special frames using modes or data rates that are employed by legacy devices. These special frames contain information that sets the network allocation vector (NAV) of legacy devices such that these devices know when the wireless channel is in use by newer stations.

Mechanisms for backward compatibility may suffer from a performance loss relative to that which can be achieved without backward compatibility and are used independently of each other. Further, in standard 11a and 11g transmitters, only 52 subcarriers (−26 . . . −1 and +1 . . . +26) are filled with non-zero values even though an IFFT (inverse fast Fourier transform) of length 64 may be used. As such, sharp frequency-domain transitions may occur between zero subcarriers and non-zero subcarriers, which results in a time-domain ringing. This adversely affects a receiver's ability to detect a valid preamble transmission and requires the receiver to perform a channel estimate using the full fast Fourier transform (FFT) size.

SUMMARY OF THE INVENTION

A method is disclosed for transmitting a frame for wireless communications. The method includes determining at least one first training sequence according to a number of antennas for transmitting a frame. The method also includes generating a preamble for the frame. The preamble includes a second training sequence and the at least one first training sequence. The method also includes transmitting the preamble with the frame using the number of antennas.

A method also is disclosed for transmitting data in a wireless system. The method includes defining a matrix for training of at least one antenna. The method also includes determining at least one first training sequence according to the matrix and a standard for wireless communication. The method also includes generating a preamble including the at least one first training sequence and a second training sequence. The preamble is compatible with the standard.

A device for wireless communication also is disclosed. The device includes a transceiver to transmit a signal. The signal includes a frame having a preamble. The device also includes a subset of subcarriers to transmit the signal within a channel. The device also includes processing means to produce at least one data stream for the frame and to generate the preamble. The preamble includes an expanded at least one first training sequence and a second training sequence.

A method also is disclosed for generating a frame for wireless communications. The method includes generating a preamble having a plurality of first training sequences and a second training sequence. The preamble is defined by a wireless communication standard. The method also includes determining the plurality of first training sequences according to the wireless communication standard. The method also includes defining a channel according to the wireless communication standard. The method also includes stimulating a set of sub carriers for the channel with the plurality of first training sequences.

DETAILED DESCRIPTION OF THE PREFERRED EMBODIMENTS

Reference will now be made in detail to the preferred embodiments of the present invention, examples of which are illustrated in the accompanying drawings.

Figure 1:
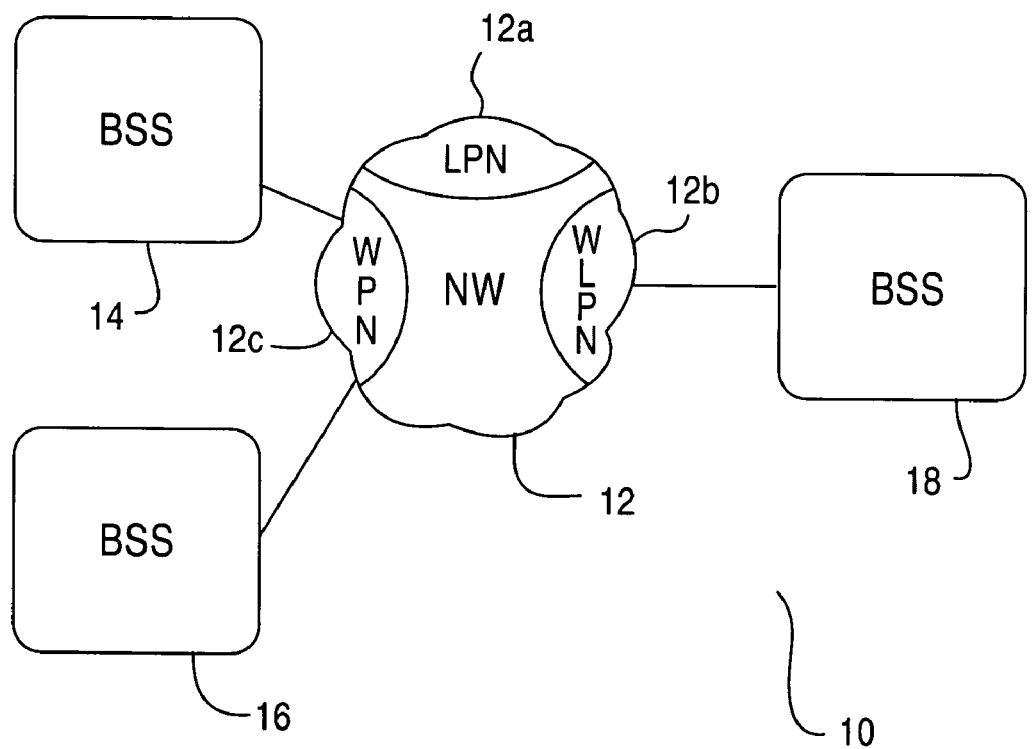
FIG. 1 illustrates a block diagram of a wireless communication system in accordance with the present invention.

FIG. 1 depicts a communications system 10 according to the present invention. Communications system 10 may include stations 14, 16 and 18. Stations 14, 16 and 18 may include wireless communication devices, such as cellular or wireless devices, digital devices, laptop or desktop computers, personal digital systems, and the like. Stations 14, 16 and 18 may be coupled to network 12, which transmits data information within communications system 10. Additional stations and applicable devices or components also may be coupled to network 12 within communications system 10.

Communications system 10 may forward data or information in the form of signals, either analog or digital. Wireless devices within the individual stations may register with the station and receive services or communications within communications system 10. Wireless devices may exchange data or information via an allocated channel. Network 12 may set up local area networks, such as local area network 12a (LAN), wide area networks, such as wide area network 12c (WAN), wireless local area networks, such as wireless local area network 12b (WLAN), ad-hoc networks and the like.

Communications system 10 may operate according to the IEEE 802.11n (standard 11n) protocol for wireless communications. Alternatively, communications system 10 may operate under a variety of standards or protocols, such as standard 11a, and standard 11n, and include legacy devices or components. For example, certain components may comply with standard 11a while newer components may comply with standard 11n. Standard 11n may occupy the 5-6 GHz band, or, alternatively standard 11n may occupy the 2.4 GHz band. Standard 11n also may be considered an extension of standard 11a. Standard 11n devices and components may operate with a bandwidth of 100 MHz. The devices and components may know the physical layers rate for standard 11n devices and components of communication system 10 may be greater than those of previous standards. Further, the bandwidth for channels of standard 11n may be 20 MHz or 40 MHz. Thus, standard 11n may implement wider channel bands than previous standards. For example, instead of 20 MHz bands, standard 11n may put two bands together as a 40 MHz band and may send twice as much data. Moreover, information may be filled in the gap between the two 20 MHz bands and their falloffs. By filling in these gaps, data or information sent according to standard 11n might over be twice as much as that sent according to legacy standards.

Standard 11n may be applicable to different configurations of communication system 10. For example, antennas may be used in the wireless devices and components in communications system 10. In order to operate multiple transmitters, communications system 10 may have multiple receivers so that several different signals may be transmitted within communications system 10. The number of receivers may be dependent upon the number of streams of data or the number of transmitters. For example, the number of receivers within communications 10, or any device or component thereof, may be equal to or greater than the number of data streams.

Therefore, communications system 10 may include a multiple input, multiple output (MIMO) structure. MIMO structures may be implemented in communications system 10 to improve robustness of wireless communications. To better improve robustness, communications system 10 also may set the number of data streams to be less than the number of transmitters in a wireless device. Depending on the number of transmitters within the device, the effectiveness of the transmission and reception of signals may be determined.

Various parameters may be taken into account regarding transmission channels under standard 11n, as well as previous standards. For example, the transmission channel may have certain shapes or wave forms. Data rates of the signals may be derived from the expanded bandwidth in the number of transmission. On the receiver side, channel estimation may be achieved by using training within the preamble of a signal. On the transmitter side, channel sounding may be used to determine what the transmitter is supposed to send. Channel estimation may relate to what sort of signal is sent, what the signal looks like, and how the signal may be received. For example, standard 11n may implement long training sequences to provide channel estimation and sounding.

Communications system 10 may resolve the issue of taking standard 11a signals and having the signals operate within a MIMO system using multiple antennas. For example, communications system 10 may determine how the standard 11a signals will work within the wider bandwidth of standard 11n. Thus, communications system 10 may increase the probability of reception of signals transmitting large amounts of data. One factor may be the presumption that all of the devices and components within communications system 10 may receive all transmitted signals, no matter what format or standard is used.

Figure 2:
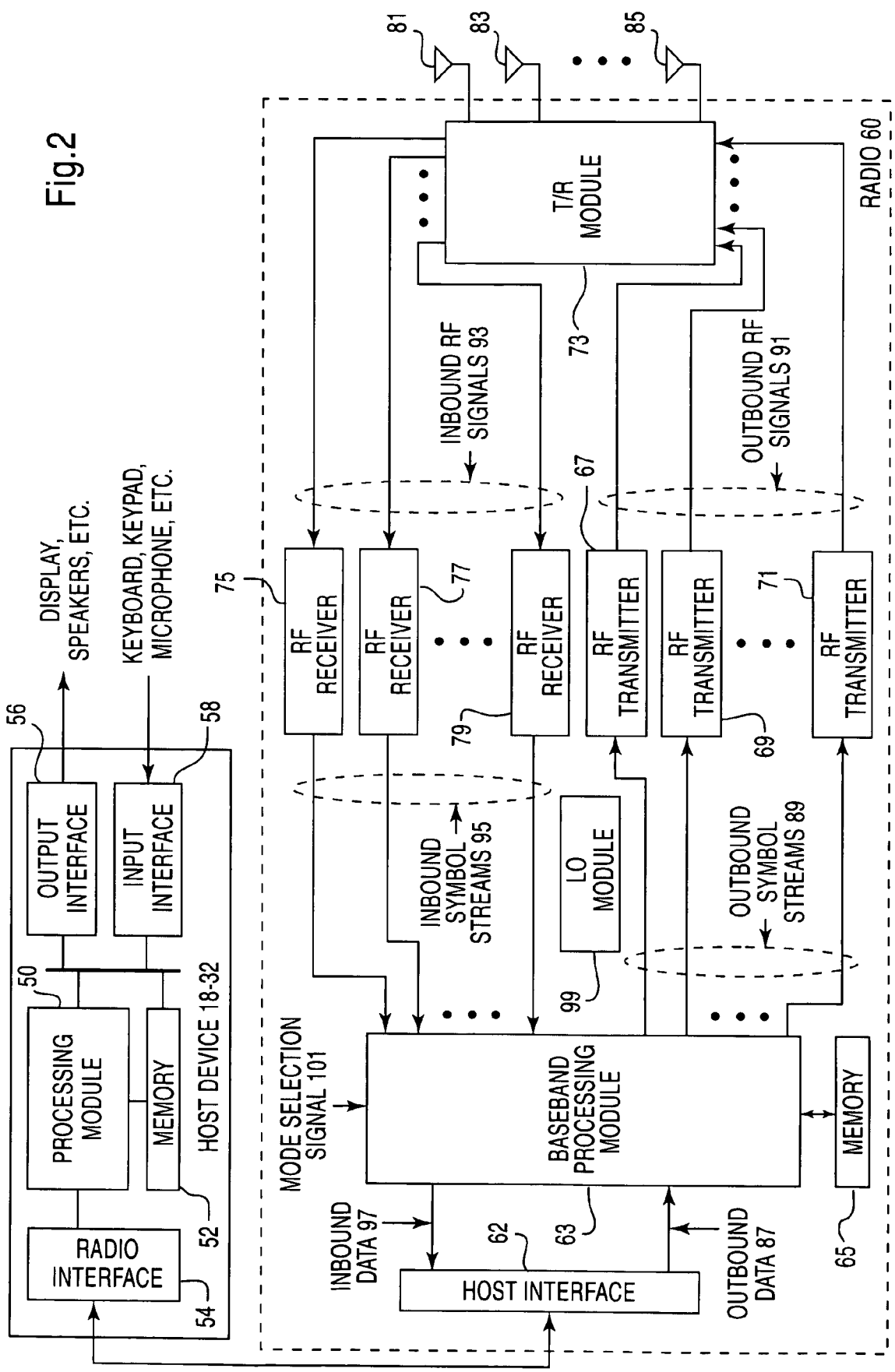
FIG. 2 illustrates a block diagram of a wireless communication device in accordance with the present invention.

FIG. 2 depicts a block diagram illustrating a wireless communication device according to the present invention. The wireless device may include host device 18 and an associated radio 60. For cellular telephone hosts, radio 60 is a built-in component. For personal digital assistants hosts, laptop hosts, or personal computer hosts, radio 60 may be built-in or an externally coupled component.

Radio 60 may include host interface 62, baseband processing module 63, memory 65, plurality of radio frequency (RF) transmitters 67, 69, and 71, transmit/receive (T/R) module 73, plurality of antennas 81, 83, and 85, plurality of RF receivers 75, 77, and 79, and local oscillation module 99. Baseband processing module 63, in combination with operational instructions stored in memory 65, may execute digital receiver functions and digital transmitter functions. Baseband processing modules 63 may be implemented using one or more processing devices. Memory 65 may be a single memory device or a plurality of memory devices. When processing module 63 implements one or more of its functions via a state machine, analog circuitry, digital circuitry, or logic circuitry, memory 65 may store the corresponding operational instructions may be embedded with the circuitry comprising the state machine, analog circuitry, digital circuitry, or logic circuitry.

In operation, radio 60 receives outbound data 87 from host device 18 via host interface 62. Baseband processing module 63 receives outbound data 87 and, based on a mode selection signal 101, produces one or more outbound symbol streams 89. Mode selection signal 101 may indicate a particular mode. For example, mode selection signal 101, may indicate a frequency band, a channel bandwidth of 20 or 22 MHz and a maximum bit rate of 54 megabits-per-second. Mode selection signal 101 also may indicate a particular rate ranging from 1 megabit-per-second to 54 megabits-per-second. In addition, mode selection signal 101 may indicate a particular type of modulation, which includes, but is not limited to, Barker Code Modulation, BPSK, QPSK, CCK, 16 QAM and/or 64 QAM. A code rate is supplied as well as number of coded bits per subcarrier (NBPSC), coded bits per OFDM symbol (NCBPS), data bits per OFDM symbol (NDBPS), error vector magnitude in decibels (EVM), sensitivity that indicates the maximum receive power required to obtain a target packet error rate (e.g., 10% for standard 11a), adjacent channel rejection (ACR), and an alternate adjacent channel rejection (AACR).

Baseband processing module 63, based on mode selection signal 101 may produce one or more outbound symbol streams 89 from output data 88. For example, if mode selection signal 101 indicates that a single transmit antenna is being utilized for the particular mode that has been selected, baseband processing module 63 may produce a single outbound symbol stream 89. Alternatively, if mode selection signal 101 indicates 2, 3 or 4 antennas, baseband processing module 63 may produce 2, 3 or 4 outbound symbol streams 89 corresponding to the number of antennas from output data 88.

Depending on the number of outbound streams 89 produced by baseband module 63, a corresponding number of RF transmitters 67, 69, and 71 may be enabled to convert outbound symbol streams 89 into outbound RF signals 91. T/R module 73 receives outbound RF signals 91 and provides each outbound RF signal to a corresponding antenna 81, 83 and 85.

When radio 60 is in the receive mode, T/R module 73 receives one or more inbound RF signals via antennas 81, 83, and 85. T/R module 73 provides inbound RF signals 93 to one or more RF receivers 75, 77, and 79. Inbound RF signals 93 are converted into a corresponding number of inbound symbol streams 96. The number of inbound symbol streams 95 may correspond to the particular mode in which the data was received. Baseband processing module 63 receives inbound symbol streams 89 and converts them into inbound data 97, which is provided to host device 18 via host interface 62.

Figure 3:
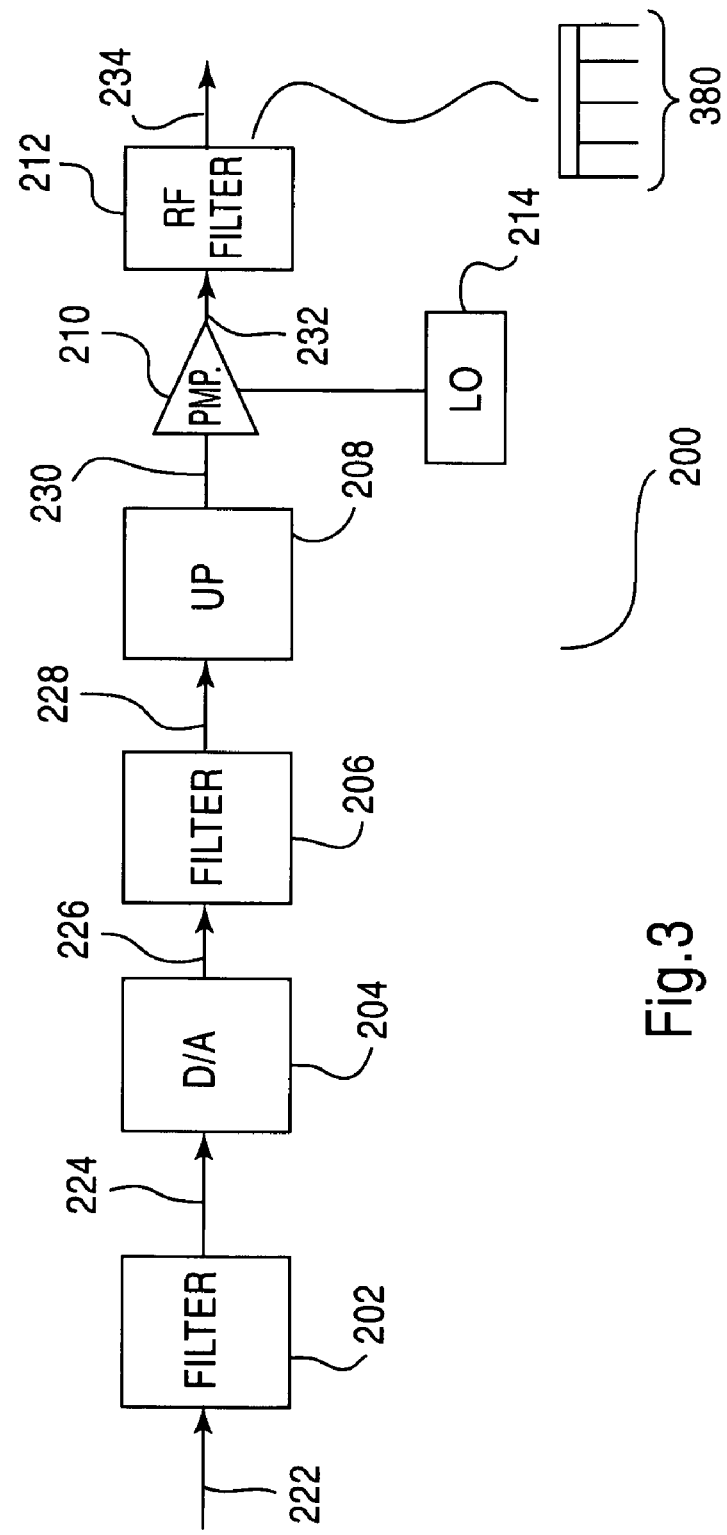
FIG. 3 illustrates a block diagram of an RF transmitter in accordance with the present invention.

FIG. 3 depicts a block diagram of an RF transmitter 200 according to the present invention. RF transmitter 200 may include a filter 202, a digital-to-analog conversion module 204, a filter 206, and an up-conversion module 208. RF transmitter 200 also may include a power amplifier 210 and an RF filter 212. Filter 202 may include a digital filter that receives one of outbound signal streams 222. Filter 202 may digitally filter an outbound signal and may up-sample the rate of outbound signal streams 222 to a desired rate to produce filtered signal streams 224. Digital-to-analog conversion (D/A) module 204 may convert the filtered signal streams 224 into analog signals 226. Analog signals 226 may include an in-phase component and a quadrature component.

Filter 206 may be an analog filter that filters analog signals 226 to produce filtered analog signals 228. Up-conversion module 208 may include a pair of mixers and a filter. Up-conversion module 208 may mix filtered analog signals 228 with a local oscillation signal that is produced by local oscillation module 214. Up-conversion module 208 may produce high frequency signals 230. The frequency of high frequency signals 230 may correspond to the frequency outbound RF signals 234. Power amplifier 210 may amplify high frequency signals 230 to produce amplified high frequency signals 232. RF filter 212 may be a high frequency band-pass filter that filters amplified high frequency signals 232 to produce output RF signals 234.

Transmitter 200 may be configured to generate or create signals from digital data or packets that are supported by standard 11n. Further, transmitter 200 may generate or create signals to perform channel estimation or channel sounding. Transmitter 200 also may be coupled to multiple antennas 380. Antennas 380 may support the MIMO wireless communication used in standard 11n. Alternatively, transmitter 200 may be coupled to a single input single output configuration that complies with legacy standards, such as standard 11a or 11g.

Transmitter 200 may transmit to multiple receivers within the network or communication system. Further, additional transmitters may be coupled to antennas 380 to transmit signals. Transmitter 200 also may be implemented in a device or component within a communication system. For example, transmitter 200 may be implemented in a wireless device that exchanges data or information within a wireless local area network.

Figure 4:
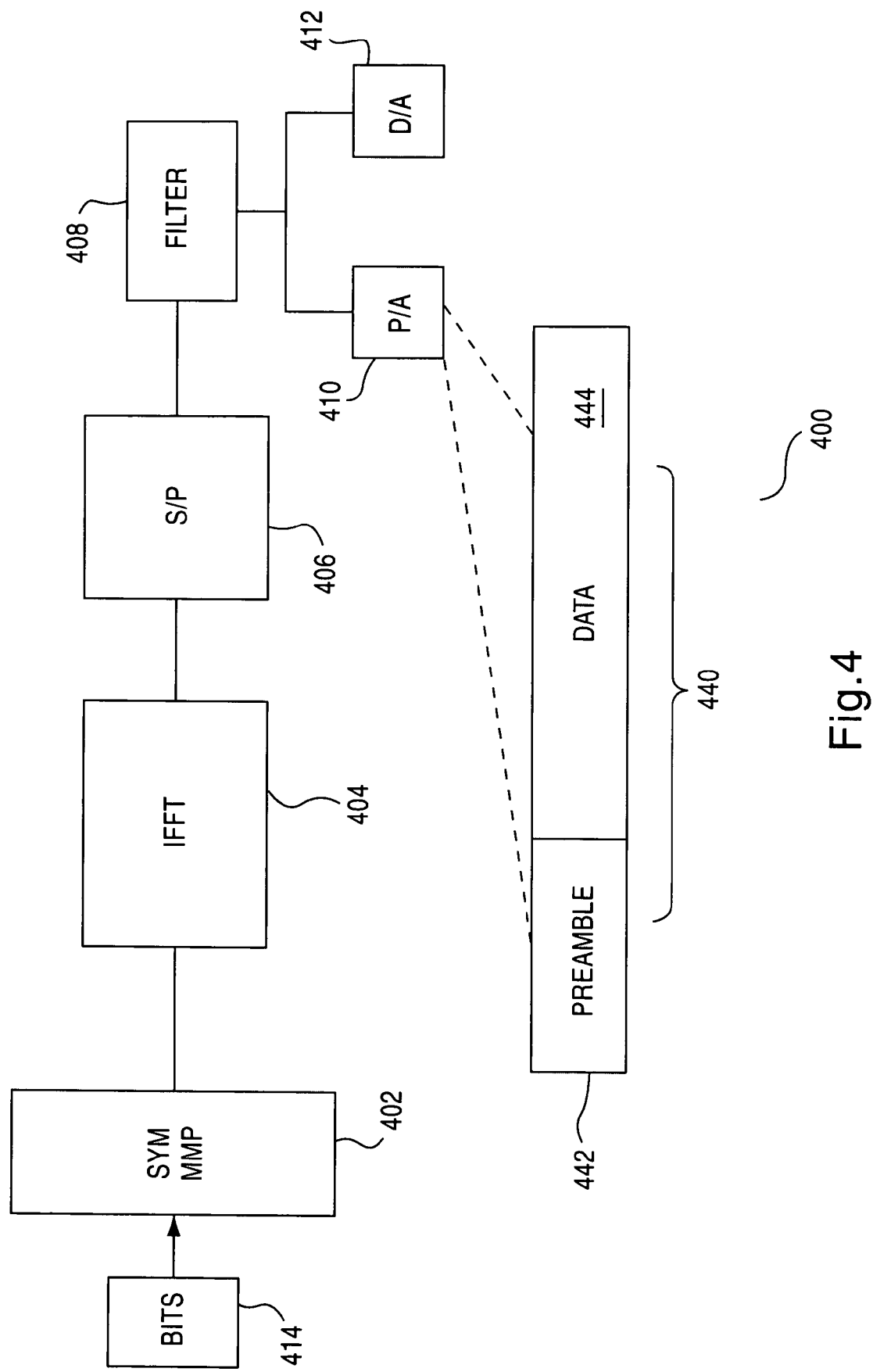
FIG. 4 illustrates a block diagram of a processor to generate an expanded long training in accordance with the present invention.

FIG. 4 depicts a block diagram of a processor 400 configured to generate an expanded long training sequence according to the present invention. Processor 400 may include a symbol mapper 402, an inverse fast Fourier transform (IFFT) module 404, a serial to parallel module 406, a digital transmit filter or time domain window module 408, and digital to analog converters (D/A) 410 and 412.

For an expanded long training sequence, symbol mapper 402 may generate symbols from coded bits 414 for each of the 64 subcarriers of an orthogonal frequency division multiplexings (OFDM) sequence. IFFT module 404 may convert the subcarriers of an applicable channel from the frequency domain to the time domain. Serial to parallel module 406 may convert the serial time domain signals into parallel time domain signals that are subsequently filtered and converted to analog signals via D/A converters 410 and 412.

Transmitter 400 may generate or create frame 440. Frame 440 may be encoded and placed in a signal generated by transmitter 400. Frame 440 may include preamble 442 and data field 444. Frame 440 may be supported by standard 11n. Standard 11n may apply to frame based communication systems, which systems include transmitter 400.

Preamble 442 may be applicable to standard 11n, standard 11a and standard 11g protocol network and systems and include a short training and a long training sequence. A short training sequence may be about 8 microseconds and provides a rough synchronization, identification, a coarse frequency check and auto gain control for frame 440. A long training sequence may perform fine frequency acquisition and channel estimation. The long training sequence also may be referred to as the first training sequence, while the short training sequence may be referred to as the second training sequence. Preamble 442 may prefer a receiver that receives frame 440 for proper transmission or reception of signals.

Preamble 442 may address backward compatibility between frame 440 and legacy devices or components already installed within the network. Legacy devices or components may support previous standards or protocols, such as standard 11a or 11g. In transmitting frames or signals according to standard 11n, legacy devices, components, stations, and the like may be kept at the network using the physical layer. Thus, preamble 442 may trick standard 11a and standard 11g stations to stay off the network when a frame, or signal, supported by standard 11n is transmitted. Preamble 442, however, also may be a valid header recognizable by the different legacy and current stations.

Preamble 442 may be a physical header. Two types of physical headers may apply in generating frame 440. A Greenfield header may be used when no valid standard 11a or standard 11g preamble is desired. A Brownfield header, or legacy header, may be used when a valid standard 11a or standard 11g preamble is desired. A Brownfield header may incur a 20 microsecond penalty by adding extra long training or additional fields within preamble 442 or data field 444. Legacy devices, however, receiving a Brownfield header know to stay off the network and to not collide or interfere with frame 440. Multiple sequences may be added to preamble 442 for frames supported by standard 11n.

Figure 5:
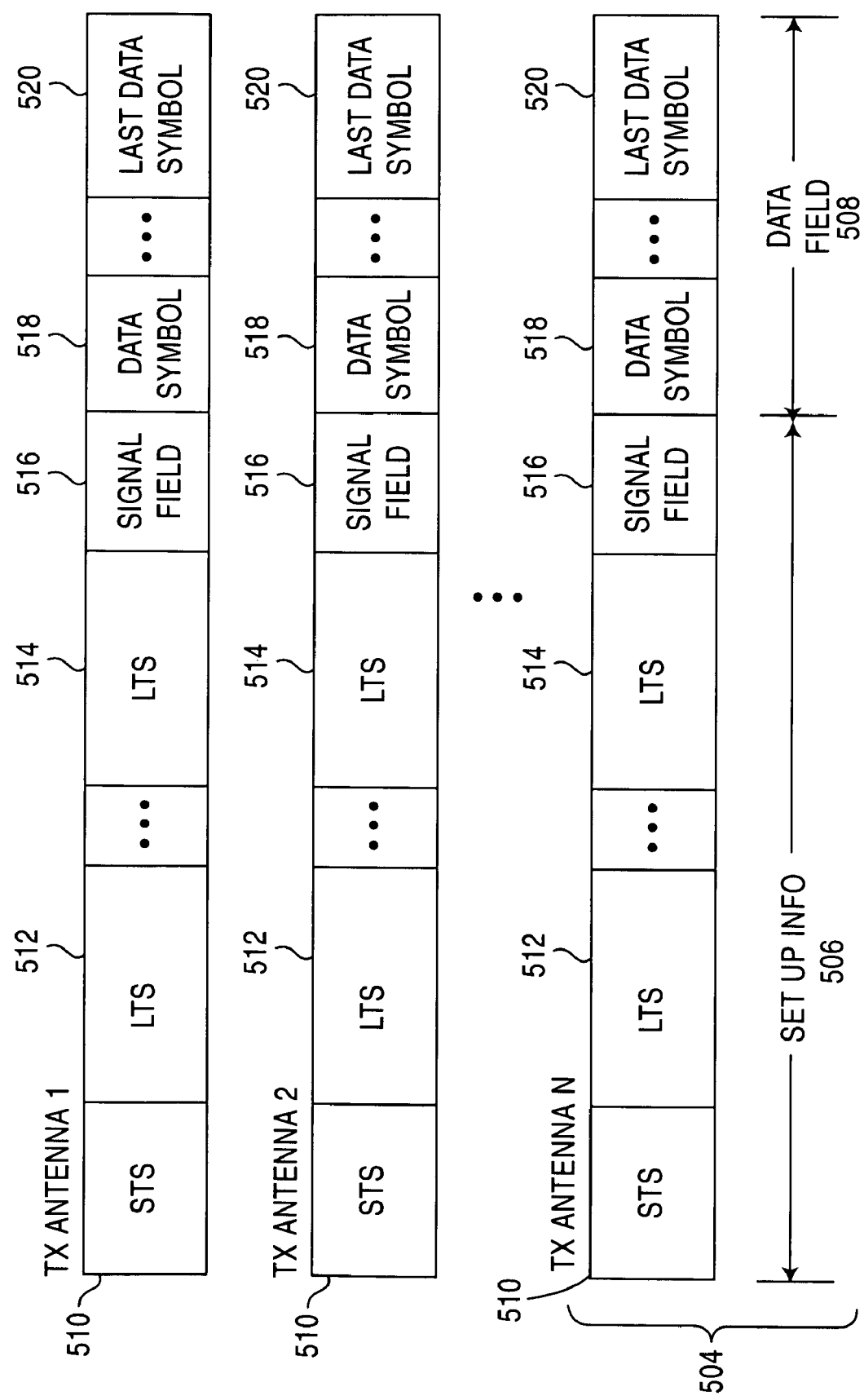
FIG. 5 illustrates frames for wireless communication between two wireless devices in accordance with the present invention.

FIG. 5 depicts frames for wireless communication between two wireless communication devices according to the present invention. The wireless communication devices may be in a proximal region where the protocol that is used is standard 11n. The wireless communication may be direct, such as from a wireless communication device to a wireless communication device, or indirect, such as from a wireless communication device to an access point to a wireless communication device. For example, first wireless communication device may provide frame 504 to a second wireless communication device using multiple antennas. Frame 504 may include a wireless communication set-up information field 506 and a data field 508.

Set-up information field 506 may include a short training sequence 510 that may be about 8 microseconds long, a $1^{st}$ supplemental long training sequence 512 that may be about 4 microseconds long, which may be one of a plurality of supplemental long training sequences 514, and a signal field 516 that may be about 4 microseconds long. The number of supplemental long training sequences 514 may correspond to the number of transmit antennas utilized for multiple input multiple output (MIMO) radio communications. One or more of supplemental long training sequences 514 may be expanded, as described above.

Data field 508 of frame 504 includes a plurality of data symbols 518, each being about 4 microseconds in duration. Last data symbol 520 also may include applicable tail bits and padding bits in addition to data symbols.

The preamble, which may be referred to as a "Greenfield" header or preamble, is used when standard 11n devices are present. Alternatively, the preamble may be used with legacy devices (.11,.11a,.11b, and .11g) when MAC level protection, such as RTS/CTS or CTS to self, is employed. MAC level protection may also be used when legacy stations are not present to protect very long bursts.

Short training sequence 510 may be the same as one for standard 11a for TX antenna 1. For antennas 2 to N, a cyclic shifted version of the same sequence may be used. The amount of cyclic shift per antenna may be computed from (Antenna number—1)*800/N in nanoseconds. Thus for antenna 1, the shift may be zero. For 2 antennas, the shift may be 0 ns for antenna 1 and 400 ns for antenna 2. For 3 antennas, the shifts may be 0, 250, and 500 ns. For 4 antennas, the shifts may be 0, 200, 400, and 600 ns. The implementation may include the shifts being rounded to units of 50 ns for the inverse of the symbol clock frequency. Shifts may be implemented in either a forward or backward direction.

Several possible implementations of the supplemental long training sequences may exist: (m=1). For example, this implementation may include one long training sequence. For antenna 1, it may be the same as the standard 11a long training sequence but about 4 microseconds long, including a 0.8 microsecond guard interval. For antennas 2 to N, it may be a cyclic shifted version of the same sequence. The amount of cyclic shift per antenna may be computed from (Antenna number—1)*4/N in microseconds. Thus for 1 antenna, the shift may be zero. For 2 antennas, the shift may be 0 ns for antenna 1 and 4 us for antenna 2. For 3 antennas, the shifts may be 0, 2.65 us, and 5.35 us. For 4 antennas, the shifts may be 0, 2, 4, and 6 microseconds. The shifts may be rounded to units of 50 ns or the inverse of the symbol clock frequency. Shifts may be implemented in either a forward or backward direction.

For (m=N), the number of training sequences may be equal to the number of transmit antennas. This example may differ from the (m=1) example because of less channel estimation error at the receiver, especially for a large numbers of antennas. Thus, it may be scalable. Thus, the following choices of training sequence may exist:

Zero space—sequences (1,1), (2,2), (3,3), . . . up to (N,N) may be the same as the standard 11a long training sequence. All others (i.e. (1,2), (2,1), etc) may be null so that nothing is transmitted during that time slot.)

Subchannel null—the set of sub-channels in the training sequences may be sub-divided by the number of transmit antennas. Individual subsets may be activated on each sub-training interval.

Orthogonal sequences for OFDM transmission may be generated by multiplying the subcarriers of the standard 11a long training sequence by an m×m orthonormal matrix, which generates a discrete Fourier transform.

Figure 6:
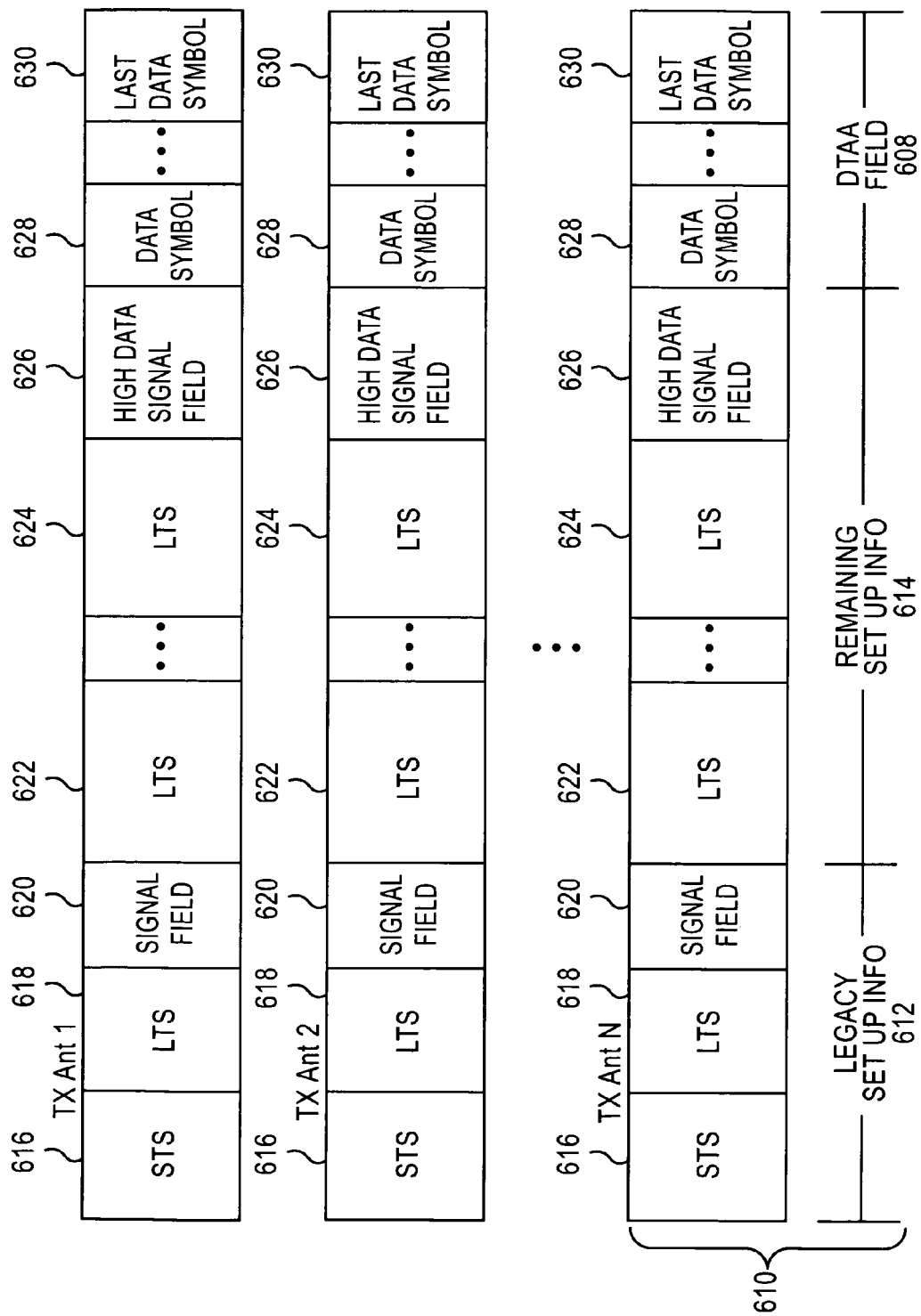
FIG. 6 illustrates frames for wireless communication between two wireless devices in accordance with the present invention.

FIG. 6 depicts frames for wireless communication between two wireless communication devices according the present invention. The wireless communication devices may be compliant with standard 11n. Such a communication may take place within a proximal area that includes standard 11n compliant devices, standard 11a compliant devices or standard 11g compliant devices. The wireless communication may be direct or indirect where a frame 610 includes a legacy filed of set-up information 612, remaining set-up information field 614, and the field 608 using multiple antennas.

The legacy portion of set-up information 612 includes a short training sequence 616, which is about 8 microseconds in duration, a long training sequence 618, which is about 8 microseconds in duration, and a signal field 620, which is about 4 microseconds in duration. Signal field 620 may include several bits to indicate the duration of frame 610. As such, standard 11a compliant devices within the proximal area and the standard 11g compliant devices within the proximal area may recognize that a frame is being transmitted even though such devices may not be able to interpret the remaining portion of the frame. Thus, the legacy devices of standard 11a and standard 11g may avoid interference or avoid collision with the standard 11n communication based on a proper interpretation of the legacy portion of set-up information 612.

Remaining set-up information 614 may include additional supplemental long training sequences 618 and 620, which are each about 4 microseconds in duration. Remaining set-up information 614 also may include a high data signal field 626, which is about 4 microseconds in duration to provide additional information regarding frame 610. Data field 608 may include data symbols 628, which are about 4 microseconds in duration. Last data symbol 630 may also include tail and padding bits. Thus, the legacy protection may be provided at the physical layer. One or more supplemental long training sequences 624 may be expanded, as described above.

For example, m may be the number of longer training sequences per frame, N is the number of transmit antennas, the preamble also referred to as "Brownfield" may be when standard 11a or standard 11g legacy devices or components present. Short training sequence 616 and long training sequence 618 are the same as standard 11a for TX antenna 1. For antennas 2 to N, the following process may exist:

Use a cyclic shifted version of the same sequence. The amount of cyclic shift per antenna may be computed from (Antenna number—1)*800/N in nanoseconds for the short training and (Antenna number—1)*4/N in microseconds Another mode is to leave the short training through signal field parts transmitted on antennas 2 to N as null, such that these antennas do not transmit during this interval. Supplemental long training sequences 624 from antenna 1 are not used and nothing is transmitted during this time.

Signal field 620 may follow the same format as standard 11a, except the reserved bit (4) may be set to 1 to indicate a standard 11n frame and subsequent training for standard 11n receivers. Supplemental long training sequences 624 may be defined as follows:

(m=1) There may be one long supplemental training sequence. It may be orthogonal to the standard 11a long training sequence.

(m=N) The number of training sequences may be equal to the number of transmit antennas. This example is different from the (m=1) example because it may lead to less channel estimation error at the receiver, especially for large numbers of antennas. Thus, it may be scalable.

The following are some possible choices of a training sequence:

Zero space—For example, sequences (1,1), (2,2), (3,3), ... up to (m,m) are the same as the 802.11a long training sequence. All others (i.e. (1,2), (2,1), etc) may be null such that nothing is transmitted during that time slot.

Subchannel null—For example, the set of sub-channels in the training sequences may be sub-divided by the number of transmit antennas. Individual subsets are activated on each sub-training interval.

Orthogonal sequences for OFDM transmission may be generated by multiplying the standard 11a long training sequence by an m×m orthonormal matrix, which generates a discrete Fourier transform. For example, the 4 antenna example may employ the following orthonormal matrix (Equation 01) to generate the subcarriers for each supplemental long training sequence.

$$S_k = \begin{bmatrix} s_{10,k} & s_{11,k} & s_{12,k} \\ s_{20,k} & s_{21,k} & s_{22,k} \\ s_{30,k} & s_{31,k} & s_{32,k} \end{bmatrix} \quad (01)$$

$$= \begin{bmatrix} s_{00,k} & s_{00,k} \cdot e^{i\cdot\theta_k} & s_{00,k} \cdot e^{i\cdot\phi_k} \\ s_{00,k} & s_{00,k} \cdot e^{i(\theta_k - \frac{4\pi}{3})} & s_{00,k} \cdot e^{i(\phi_k - \frac{2\pi}{3})} \\ s_{00,k} & s_{00,k} \cdot e^{i(\theta_k - \frac{2\pi}{3})} & s_{00,k} \cdot e^{i(\phi_k - \frac{4\pi}{3})} \end{bmatrix}$$

$$\theta_k = \pi \cdot k / (4 \cdot N_{subcarriers})$$

$$\phi_k = \pi \cdot (k+4) / (2 \cdot N_{subcarriers})$$

Figure 7:
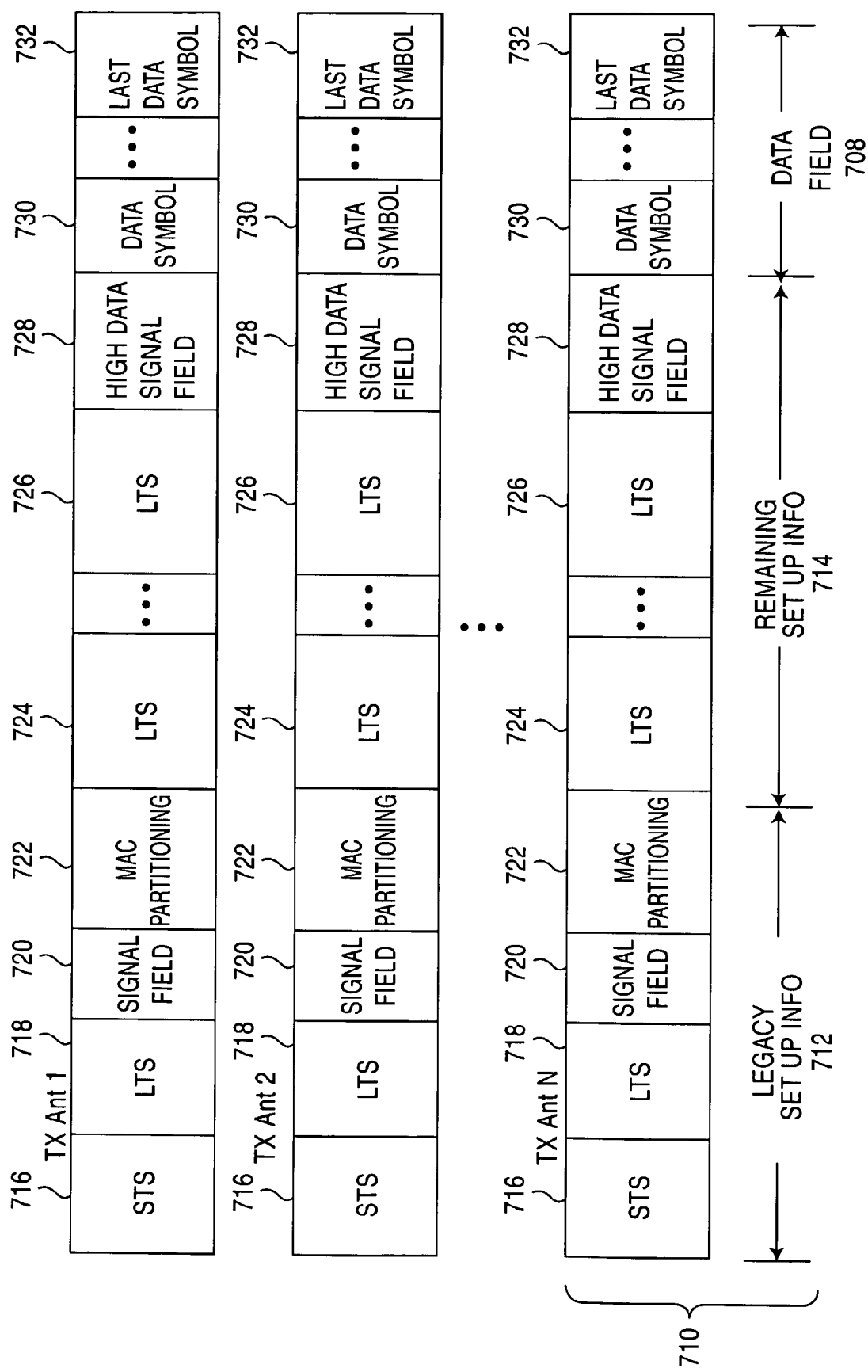
FIG. 7 illustrates frames for wireless communication between two wireless communication devices in accordance with the present invention.

FIG. 7 depicts frames for wireless communication between two wireless communication devices according the present invention. The wireless communication devices may be standard 11n compliant using multiple antennas. The wireless communication may be direct or indirect within a proximal area that includes standard 11n compliant devices, standard 11a, standard 11b, and standard 11g devices. For example, frame 710 may include a legacy portion of set-up information field 712, remaining set-up information field 714 and data field 708. The legacy portion of set-up information 712 includes an IEEE 802.11 PHY preamble with short training sequence 716, long training sequence 718, signal field 720 and a MAC partitioning frame field 722. MAC field 722 may indicate the particulars of frame 710 that may be interpreted by legacy devices. For example, the legacy protection is provided at the MAC layer. The fields may follow the same structure as described above, with the exception of signal field 720. This structure is an alternative that uses MAC partitioning to set the NAV of legacy stations. MAC partitioning field 722 may contain frame information, coded at a legacy rate to allow reception by standard 11a and standard 11g stations.

Remaining set-up information 714 may include a plurality of supplemental long training sequences 724 and 726 and high data service field 728. Data field 708 may include a plurality of data symbols 730. Last data symbol 732 may include tail and padding bits. One or more of supplemental long training sequences 720 may be expanded, as previously described.

Thus, within frame 710, legacy set-up info 712 and remaining set-up info 714 may be joined to form the preamble of frame 710. The preamble may correspond to preamble 442 of FIG. 4. As discussed above, the preamble of frame 710 may be a Greenfield preamble if there is no valid standard 11a or standard 11g preamble. For example, set-up info 506 of frame 504 of FIG. 5 may be considered a Greenfield preamble. A Brownfield preamble may have valid standard 11a or standard 11g preamble that informs legacy devices or components to stay offline, or off the network, so as to not interfere or collide with frames using the standard 11n protocol. Frame 710 of FIG. 7 may include a Brownfield preamble. Legacy set-up information 712 may include a 20 microsecond penalty when compared to the Greenfield preamble. Both the Greenfield and the Brownfield preambles may be PHY headers.

Further, extra long training, such as long training sequence 718, may be used for MIMO channels, having multiple antennas. Because of the multiple antennas, more training information may be desired to be delivered in frame 710 and the frames associated with transmit antennas 1 and 2. Multiple sequences may be added in standard 11n to the preamble to indicate what frame 710 is. MAC partitioning field 722 also facilitates legacy set-up info 712 and indicates the particulars of frame 710 that is interpreted by legacy devices. Protection for frame 710 may be provided at the MAC layer of a device, such as a legacy device.

Frame 710 may be applicable to MIMO devices that use multiple antennas to exchange information or data within a channel. If the antennas were to simultaneously transmit long training sequences, then a receiver may be overwhelmed by the number of long training sequences received. An overwhelmed receiver may attempt to long train according to different long training sequences and treat different frames in an improper manner by misreading legacy or remaining set-up information. Thus, for a number of transmit antennas, a receiver may desire that number of pieces of training from each antennas. Thus, matrix, as described in FIG. 6, may be generated but includes values for long training sequences within applicable frames. For example, supplemental long training sequences 724 and 726 may be set up as a matrix that performs the long training for a multiple or group of antennas. This matrix may be a general matrix that is sent over multiple antennas. In addition, applicable methods for determining the matrix also may be sent out over antennas. For example, there may be one long training sequence, such as long training sequence 718, for each antenna. This method may take advantage of a long training sequence that has a low cross-correlation with itself. Further, this method may implement the shortest long training sequence but may invoke an increased error. This method also may be more practical for a two transmitter antenna, that includes values that alternate between even and odd subspaces. Another method or process for determining the matrix is to transmit for multiple antennas may be applying a discrete Fourier transform with a weighting matrix.

Another method for determining an applicable matrix may be transmitting zero everywhere such that only one transmitter is on at a time. The overall receive power may be less if a reduced probability of error through. Another method of process may be a sub-null that uses the same sequence to create another way of orthoganality. For example, the first transmitter may transmit even subspaces and a second transmitter may transmit odd subspaces too. A resulting matrix may include values that alternate between The preceding discussion has presented various embodiments for preamble generation for wireless communications in a wireless communication system. As one of average skill in the art will appreciate, other embodiments may be derived from the teachings of the present invention without deviating from the scope of the claims or their equivalents.

The invention claimed is:

1. A method for transmitting a frame for wireless communication, the method comprising:
   determining at least one first training sequence according to a number of antennas for transmitting a frame;
   generating a preamble for said frame, said preamble including a second training sequence and said at least one first training sequence; and
   transmitting said preamble with said frame using said number of antennas,
   wherein said determining includes deriving a matrix for said at least one first training sequence, and
   wherein said deriving includes determining a size for said matrix, wherein said size corresponds to said number of antennas.

2. The method of claim 1, wherein said generating includes determining a type of said preamble, and wherein said type corresponds to a protocol standard.

3. The method of claim 2, wherein said protocol standard comprises a current wireless communication standard.

4. The method of claim 2, wherein said protocol standard comprises a legacy wireless communication standard.

5. The method of claim 1, wherein said generating includes generating a legacy set up information field.

6. The method of claim 1, wherein said generating includes generating a remaining set up information field.

7. The method of claim 1, further comprising determining whether a legacy device is receiving said frame.

8. The method of claim 1, wherein said generating comprises inserting a signal field into said preamble.

9. The method of claim 1, wherein said generating comprises generating a legacy set up information field in said preamble.

10. The method of claim 1, wherein said generating includes determining a type of said preamble.

11. The method of claim 10, wherein said type corresponds to a wireless communication protocol standard.

12. The method of claim 11, wherein said wireless communication protocol standard comprises a wireless digital communication protocol standard.

13. The method of claim 11, wherein said wireless communication protocol standard comprises a wireless local area network communication protocol standard.

14. The method of claim 11, wherein said wireless communication protocol standard comprises IEEE 802.11n protocol.

15. The method of claim 1, wherein said wireless communication comprises multiple-input-multiple-output (MIMO) wireless communication.

16. The method of claim 1, wherein said wireless communication comprises orthogonal frequency division multiplexing (OFDM) wireless communication.

17. The method of claim 1, wherein said wireless communication comprises advanced mobile phone services (AMPS) or digital AMPS.

18. The method of claim 1, wherein said wireless communication comprises global system for mobile communications (GSM) wireless communication.

19. The method of claim 1, wherein said wireless communication comprises code division multiple access (CDMA) wireless communication.

20. The method of claim 1, wherein said wireless communication comprises Bluetooth wireless communication.

21. The method of claim 1, wherein said wireless communication comprises one or more of the following types of wireless communication: IEEE 802.11a communication, IEEE 802.11b communication and 802.11g communication.

* * * * *